United States Patent Office 3,013,055
Patented Dec. 12, 1961

3,013,055
2-METHOXY-3,5,6-TRICHLOROBENZOATES
Sidney B. Richter, Chicago, Ill., assignor to Velsicol Chemical Corporation, Chicago, Ill., a corporation of Illinois
No Drawing. Filed Aug. 4, 1958, Ser. No. 753,114
11 Claims. (Cl. 260—473)

This invention relates to new herbicidal chemical compositions and to a process for preparing these chemicals. More specifically, this invention relates to herbicidally active compounds of the formula

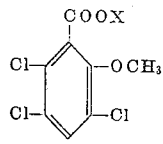

in which X is hydrogen, ammonium, an alkali metal, substituted ammonium, an alkyl radical, or a substituted alkyl radical. Thus, when X is hydrogen, the compound is 2-methoxy-3,5,6-trichlorobenzoic acid. This chemical compound and its derivatives as cited above have extraordinarily great acivity as herbicides useful for the destruction of undesirable plant life.

In accordance with the present invention, it has also been found that 2-methoxy-3,5,6-trichlorobenzoic acid can be obtained readily in good yield from 3,5-dichlorosalicylic acid. 3,5-dichlorosalicylic acid, which can also be named 2-hydroxy-3,5-dichlorobenzoic acid, is obtained by the direct chlorination of salicylic acid. The 3,5-dichlorosalicylic acid is then converted to 3,5,6-trichlorosalicylic acid by chlorination in the presence of fuming sulfuric acid.

According to the process of this invention, 2-methoxy-3,5,6-trichlorobenzoic acid is prepared readily, economically, and in good yield by treatment of 3,5,6-trichlorosalicylic acid as its alkali metal salt with dimethyl sulfate. The reaction is carried out in aqueous solution, which is prepared by treating each mole of 3,5,6-trichlorosalicylic acid with at least 2 moles of an alkali metal hydroxide dissolved in water. Alkali metal hydroxides such as sodium or potassium hydroxide are suitable. Although the reaction can be effected satisfactorily with a minimum of 2 moles of alkali metal hydroxide for each mole of hydroxy compound, it is desirable to use an excess of the alkali metal hydroxide. The alkali metal salt of the hydroxy-benzoic acid has limited solubility in water, and the use of an excess of up to about 5 moles of alkali metal hydroxide, for example, for each mole of the hydroxy-benzoic acid enhances solubility and avoids the use of large volumes of water. A ratio of about 4 moles of alkali metal hydroxide to each mole of 2-hydroxy-3,5,6-trichlorobenzoic acid is preferred.

The 2-hydroxy-3,5,6-trichlorobenzoic acid in aqueous solution as its alkali metal salt is treated with a minimum of 1 mole of dimethyl sulfate for each mole of the starting compound. In practice, the use of an excess of dimethyl sulfate is preferred. The compound dimethyl sulfate decomposes slightly in water, which makes somewhat less than the amount initially employed actually available for the reaction. Similarly, some esterification of the carboxylic acid group takes place while the primary reaction of methylation of the hydroxy group is being effected. Thus, an excess of dimethyl sulfate is suitably used, equivalent to up to about 5 moles of dimethyl sulfate for each mole of 2-hydroxy-3,5,6-trichlorobenzoic acid. A ratio of about 4 moles of dimethyl sulfate to each mole of starting compound is preferred.

The dimethyl sulfate is suitably added to the reaction mixture in a constant stream, in portions, or dropwise as is most convenient for the particular apparatus in use. During the addition, it is desirable to maintain the reaction temperature at from about 10° to about 100° C., with external cooling of necessary. Although the process of the invention can be carried out satisfactorily at the upper ranges of reaction temperature indicated, improved yields are obtained by working at the lower temperatures. Reaction temperatures in the range from about 20° to about 50° C. are preferred during the process of adding the dimethyl sulfate. The reaction is satisfactorily carried out at atmospheric pressure, although superatmospheric pressures can be used if desired.

After addition of all the dimethyl sulfate, the reaction mixture is heated at reflux temperature to complete the reaction. The actual time required to complete the reaction depends on a variety of factors, such as the temperature during the addition of dimethyl sulfate, the rate of addition, alkalinity of the solution, and the like. The reaction is ordinarily complete in a few hours. The reaction mixture is then treated with a fresh aqueous solution of alkali metal hydroxide and again refluxed for several hours to hydrolyze any carboxylic acid ester which may have formed as a competing reaction during the formation of the methyl ether. About one-half mole of alkali metal hydroxide is suitably used for each mole of dimethyl sulfate used in the reaction.

The cooled reaction mixture is then acidified to Congo red indicator, and the precipitated acid is filtered off. Although the crude acid so obtained is suitable for many herbicidal uses as such, it can be purified if desired. In a typical purification process, for example, the acid is dissolved in diethyl ether, and the ether solution is dried over a drying agent such as magnesium sulfate before it is filtered and the ether is removed by distillation. The residue is then dried, as in a vacuum oven, to give the crystalline solid 2-methoxy-3,5,6-trichlorobenzoic acid.

The compounds in which X is ammonium, alkali metal, an amino group, or an alkyl group can be prepared readily from the free acid. Thus X can be made ammonium by treatment of the free acid with ammonium hydroxide, whereupon the product will be ammonium 2-methoxy-3,5,6-trichlorobenzoate. Similarly, X can be made alkali metal by the treatment of the free acid with bases, such as the hydroxides, of alkali metals. Treatment of the acid with sodium hydroxide thus gives sodium 2-methoxy-3,5,6-trichlorobenzoate as the product, while the use of potassium hydroxide gives potassium 2-methoxy-3,5,6-trichlorobenzoate.

Compounds in which X is substituted ammonium are amine salts of 2-methoxy-3,5,6-trichlorobenzoic acid and are prepared by the addition of the free acid to various amines. Typical amines which can be used to prepare such amine salts are dimethylamine, trimethylamine, triethylamine, diethanolamine, triethanolamine, isopropylamine, morpholine, and the like. The resulting products are, respectively, the dimethylamino, trimethylamino, triethylamino, diethanolamino, triethanolamino, isopropylamino, and morpholino salts of 2-methoxy-3,5,6-trichlorobenzoic acid.

Compounds in which X is an alkyl group or a substituted alkyl group are esters of 2-methoxy-3,5,6-trichlorobenzoic acid and are prepared by the condensation of the acid with various alcohols. Thus the condensation of methyl alcohol with 2-methoxy-3,5,6-trichlorobenzoic acid gives the desired ester, methyl 2-methoxy-3,5,6-trichlorobenzoate. Other typical alcohols which can be used are propyl, isopropyl, n-butyl, sec-butyl, isobutyl, tert.-butyl, amyl, hexyl, heptyl, octyl, nonyl, decyl, and the like. The products are the corresponding alkyl esters of 2-methoxy-3,5,6-trichlorobenzoic acid. Although such complex esters as those prepared by the esterification of 2-methoxy-3,5,6-trichlorobenzoic acid with butoxyethanol, propyleneglycolbutyl ether and the like are useful products in accordance with this invention, preferred esters are those in which X is an unsubstituted alkyl group which contains from 1 to 10 carbon atoms. The condensation of the acid with the alcohol is carried out suitably in an inert solvent such as an aromatic hydrocarbon and in the presence of a few percent by weight of an acid catalyst such as p-toluenesulfonic acid. The water which forms during the esterification reaction can be removed continuously from the reaction mixture by distillation as it forms, and its volume can be measured to determine when the esterification is complete. The ester is then isolated by distillation of the inert solvent.

For practical use in controlling undesirable plant life, the compounds of this invention are formulated and applied in the manner known to the art. For example, these compounds can be formulated into dusts by combining them with such inert substances as talc or clays, and in this form they are dusted directly on the plants it is desired to destroy. The compounds can also be dissolved in organic solvents such as kerosene or the methylated naphthalenes. They can also be emulsified or suspended in water by the addition of emulsifiers or wetting agents. The liquid formulations of these active herbicidal compounds are either applied directly to the plants to be controlled by spraying, or the soil in which the plants are growing can be treated. Other substances such as activators, synergists, spreaders, and adhesives can be added to the formulations if desired.

The specific manner in which the compounds of this invention can be prepared and utilized is illustrated in the following examples:

EXAMPLE I

*Preparation of 3,5-dichlorosalicyclic acid*

Salicylic acid (400 g.; 2.9 moles) was slurried with 2500 ml. of glacial acetic acid in a 5-liter, round-bottomed, three-necked flask fitted with a mechanical stirrer and a gas inlet tube. The slurry was chilled by ice-cooling and was stirred vigorously while chlorine gas was passed into the reaction mixture, which was maintained below 35° C. Chlorine was passed into the reaction mixture in this manner until a 10% excess by weight over the theoretically required amount of chlorine had been introduced. The mixture was then stirred at room temperature for one hour and filtered. The white solid product was crystallized from a water-alcohol mixture to give 450 g. (75% of theory) of 3,5-dichlorosalicylic acid, melting point 216° to 218° C.

EXAMPLE II

*Preparation of 3,5,6-trichlorosalicylic acid*

3,5-dichlorosalicylic acid (336 g.; 1.61 moles) was added slowly and carefully (vigorous reaction) to 1 liter of 65% fuming sulfuric acid in a 2-liter, round-bottomed flask fitted with a reflux condenser, a mechanical stirrer, and a gas inlet tube. Chlorine gas was passed into the reaction mixture over a period of 15 hours while the pot temperature was maintained at 80°–90° C. The reaction mixture was then cooled to room temperature and poured slowly on crushed ice. The precipitated yellow solid was taken up in ether. The ether solution was dried over magnesium sulfate and filtered, and the ether was distilled off to give a residue of 279 g. (70% of theory) of 3,5,6-trichlorosalicylic acid, melting point 206° to 207° C.

EXAMPLE III

*Preparation of 2-methoxy-3,5,6-trichlorobenzoic acid*

3,5,6-trichlorosalicylic acid (250 g.; 1.04 moles) was dissolved in a solution of sodium hydroxide (232 g.; 5.8 moles) in 1400 ml. water in a 3-liter, round-bottomed flask fitted with a mechanical stirrer. The flask was packed in ice, and the reaction mixture was cooled to 20° C. Dimethyl sulfate (366 g.; 2.9 moles) was added with rapid stirring, and the mixture was stirred for 20 minutes at a temperature below 35° C. A second portion of dimethyl sulfate (366 g.) was added, and the mixture was stirred for 10 minutes at a temperature below 45° C. The reaction mixture was then refluxed for 2 hours, whereupon a solution of sodium hydroxide (116 g.) in 400 ml. water was added, and the mixture was refluxed for an additional 2 hours. The mixture was then cooled and acidified to Congo red indicator with hydrochloric acid. The precipitated solid was taken up in ether. After the ether solution was dried over magnesium sulfate and filtered, the ether was removed by distillation to yield a solid, which was crystallized from an alcohol-water mixture to give 157 g. (65%) of yellow-white 2-methoxy-3,5,6-trichlorobenzoic acid, melting point 137° to 139° C.

*Analysis* for $C_8H_5Cl_3O_3$.—Theory: C, 36.71; H, 1.97; Cl, 41.30. Found: C, 36.34; H, 1.44; Cl, 40.85.

EXAMPLE IV

*Preparation of 2-methoxy-3,5,6-trichlorobenzoic acid at an elevated temperature*

3,5,6-trichlorosalicylic acid (241 g.; 1 mole) is dissolved in a solution of potassium hydroxide (112 g.; 2.0 moles) in 1000 ml. of water. The solution is heated to reflux (about 100° C.) and stirred vigorously while dimethyl sulfate (631 g.; 5.0 moles) is added dropwise. The reaction mixture is then treated with a solution of potassium hydroxide (140 g.; 2.5 moles) in 250 ml. of water and refluxed for an additional 2 hours. The cooled reaction mixture is then acidified to Congo red with hydrochloric acid to precipitate the desired 2-methoxy-3,5,6-trichlorobenzoic acid, which is purified as described in Example III.

EXAMPLE V

*Preparation of 2-methoxy-3,5,6-trichlorobenzoic acid at a low temperature*

3,5,6-trichlorosalicylic acid (241 g.; 1.0 mole) is dissolved in a solution of sodium hydroxide (200 g.; 5.0 moles) in 2000 ml. of water. The solution is stirred vigorously and cooled to a temperature of 10° C. by means of an ice-salt bath. Dimehtyl sulfate (126 g.; 1.0 mole) is then added dropwise to the reaction mixture at such a rate that the temperature rises above 10° C. only momentarily. After all the dimethyl sulfate has been added, the reaction mixture is then allowed to come to room temperature and is heated to reflux, at which temperature it is stirred vigorously for 2 hours. A solution of sodium hydroxide (20 g.; 0.5 mole) in 250 ml. water is added, and the reaction mixture is refluxed an additional 2 hours. 2-methoxy-3,5,6-trichlorobenzoic acid is then isolated from the cooled reaction mixture as described in Example III.

EXAMPLE VI

*Preparation of sodium 2-methoxy-3,5,6-trichlorobenzoate*

2-methoxy-3,5,6-trichlorobenzoic acid (127 g.; 0.5 mole) is dissolved in 500 cc. of methanol and treated with a solution of sodium hydroxide (20 g.; 0.5 mole) in 100 cc. of methanol. The methanol is removed by distillation in vacuo on the steam bath, and the solid residue is slurried with 100 cc. of cold dry ether, filtered, pressed dry, and dried completely in a vacuum oven to given the desired salt, sodium 2-methoxy-3,5,6-trichlorobenzoate.

EXAMPLE VII

*Preparation of ammonium 2-methoxy-3,5,6-trichlorobenzoate*

Treatment of 2-methoxy-3,5,6-trichlorobenzoic acid (127 g.; 0.5 mole) in 500 cc. of methanol with 34 cc. of commercial concentrated ammonium hydroxide according to the method given in Example VI gives the desired salt, ammonium 2-methoxy-3,5,6-trichlorobenzoate.

EXAMPLE VIII

*Preparation of the dimethylamine salt of 2-methoxy-3,5,6-trichlorobenzoic acid*

2-methoxy-3,5,6-trichlorobenzoic acid (127 g.; 0.5 mole) is dissolved in 500 cc. of dry ether and treated with dimethylamine (22.5 g.; 0.5 mole). The solid which separates is filtered, washed twice with 100 cc. portions of cold ether, filtered, pressed dry, and dried completely in a vacuum oven to give the desired dimethylamine salt of 2-methoxy-3,5,6-trichlorobenzoic acid.

EXAMPLE IX

*Preparation of the diethanolamine salt of 2-methoxy-3,5,6-trichlorobenzoic acid*

In the manner described in Example VIII, 2-methoxy-3,5,6-trichlorobenzoic acid (127 g.; 0.5 mole) is treated with diethanolamine (52.5 g.; 0.5 mole) in 500 cc. of dry ether. The product which is isolated is the diethanolamine salt of 2-methoxy-3,5,6-trichlorobenzoic acid.

EXAMPLE X

*Preparation of the morpholine salt of 2-methoxy-3,5,6-trichlorobenzoic acid*

2-methoxy-3,5,6-trichlorobenzoic acid (127 g.; 0.5 mole) is treated with morpholine (43.5 g.; 0.5 mole) in 500 cc. of ether, and the product is worked up as described in Example VIII to give the desired morpholine salt of 2-methoxy-3,5,6-trichlorobenzoic acid.

EXAMPLE XI

*Preparation of ethyl 2-methoxy-3,5,6-trichlorobenzoate*

2-methoxy-3,5,6-trichlorobenzoic acid (127 g.; 0.5 mole), ethyl alcohol (23 g.; 0.5 mole), and 3.0 g. of p-toluenesulfonic acid are dissolved in 500 ml. of benzene, and the solution is placed in a 1-liter, round-bottomed flask fitted with a reflux condenser and a calibrated Dean-Stark tube. The solution is heated at reflux temperature until 9 cc. of water have been collected in the Dean-Stark tube. The cooled reaction mixture is then extracted twice with 50 cc. portions of 10% sodium carbonate solution, washed once with water, dried over anhydrous sodium sulfate, and filtered. The benzene is then distilled off in vacuo on the steam bath, and the residue is distilled in vacuo to give the desired ester, ethyl 2-methoxy-3,5,6-trichlorobenzoate.

EXAMPLE XII

*Preparation of decyl 2-methoxy-3,5,6-trichlorobenzoate*

In the manner and apparatus described in Example XI, 2-methoxy-3,5,6-trichlorobenzoic acid (127 g.; 0.5 mole) and normal primary decyl alcohol (79 g.; 0.5 mole) are refluxed in 500 ml. of benzene in the presence of 3.0 g. of p-toluenesulfonic acid until 9 cc. of water have been distilled from the reaction mixture. Work-up of the reaction mixture as described in Example XI gives the desired ester, decyl 2-methoxy-3,5,6-trichlorobenzoate.

EXAMPLE XIII

*Preparation of iso-butyl 2-methoxy-3,5,6-trichlorobenzoate*

The reaction of 2-methoxy-3,5,6-trichlorobenzoic acid (127 g.; 0.5 mole) and iso-butyl alcohol (37 g.; 0.5 mole) by the method described in Example XI is used to prepare the ester, iso-butyl 2-methoxy-3,5,6-trichlorobenzoate.

EXAMPLE XIV

*Preparation of an emulsifiable concentrate of 2-methoxy-3,5,6-trichlorobenzoic acid*

The following concentrate is prepared by mixing the ingredients intimately in the given percentage proportions by weight:

| | Percent |
|---|---|
| 2-methoxy-3,5,6-trichlorobenzoic acid | 25 |
| Antarox A-400 | 40 |
| Methanol | 35 |

"Antarox A-400" is the trade name under which a nonionic detergent of the aromatic polyethylene glycol ether type is sold. The above concentrate is diluted with water to the desired concentration for use.

EXAMPLE XV

*Preparation of an emulsifiable concentrate of iso-butyl 2-methoxy-3,5,6-trichlorobenzoate*

The following ingredients are mixed thoroughly in the given percentage proportions by weight:

| | Percent |
|---|---|
| Iso-butyl 2-methoxy-3,5,6-trichlorobenzoate | 59 |
| Triton X-100 | 5 |
| Xylene | 10 |
| Kerosene | 26 |

"Triton X-100" is the trade name under which an emulsifier of the alkyl aryl polyether alcohol type is sold. The above concentrate is diluted with water to the desired concentration for use.

EXAMPLE XVI

*Preparation of a dust from sodium 2-methoxy-3,5,6-trichlorobenzoate*

The following dry ingredients are ground together in the given percentage proportions by weight in a mechanical mixer until a homogeneous mixture is obtained:

| | Percent |
|---|---|
| Sodium 2-methoxy-3,5,6-trichlorobenzoate | 25 |
| Talc | 75 |

The resulting dust is suitable for hand or machine dusting on plants.

The herbicidal activity of chemical compounds is often demonstrated by the ability of the chemicals to kill or arrest the growth of tomato plants. The tomato plant is readily grown and maintained under uniform conditions for experimental purposes in greenhouses, and its response to chemicals is very similar to that observed for a wide variety of economically important species of undesirable plant life in the field.

The herbicidal activity of the compounds of this invention, for example, can be illustrated in greenhouse experiments on young potted tomato plants (Bonny Best variety). The compounds are formulated into 10 percent wettable powders and are dispersed in water at a concentration of 2,000 parts per million actual chemical. Ten milliliters of an aliquot portion of the dispersion is added to the soil surface of the tomato plants, approximately 5 to 7 inches tall. In order to avoid undue concentration or accumulation of the chemical in any given area, 5 holes the size of a pencil and about 1 inch deep are punched in the soil surface around the shoot, and the 10 milliliter application is divided equally among the 5 holes. Three plants are used for each application. The treated plants are held under greenhouse conditions for 7 days, provided with subterranean watering, and observed for response to treatment. The results indicate a high order of herbicidal toxicity of the compounds of this invention compared to the untreated controls.

I claim:

1. A compound selected from the group consisting of 2-methoxy-3,5,6-trichlorobenzoic acid, its alkali metal salts, its ammonium salt, its morpholine salt, its alkyl amine salts in which the amine component is an unsubstituted alkyl amine of up to six carbon atoms, its alkanol amine salts in which the amine component is an unsubstituted alkanol amine of up to six carbon atoms, its butoxyethanol ester, and its esters in which the esterifying group is an unsubstituted alkyl group of from one to ten carbon atoms.

2. An alkali metal salt of 2-methoxy-3,5,6-trichlorobenzoic acid.

3. An alkyl amine salt of 2-methoxy-3,5,6-trichlorobenzoic acid in which the amine component is an unsubstituted alkyl amine of up to six carbon atoms.

4. An ester of 2-methoxy-3,5,6-trichlorobenzoic acid in which the esterifying group is an unsubstituted alkyl group of from one to ten carbon atoms.

5. 2-methoxy-3,5,6-trichlorobenzoic acid.

6. Sodium 2-methoxy-3,5,6-trichlorobenzoate.

7. The diethanolamine salt of 2-methoxy-3,5,6-trichlorobenzoic acid.

8. n-Butyl 2-methoxy-3,5,6-trichlorobenzoate.

9. Iso-propyl 2-methoxy-3,5,6-trichlorobenzoate.

10. An alkanol amine salt of 2-methoxy-3,5,6-trichlorobenzoic acid wherein the amine component is an unsubstituted alkanol amine of up to six carbon atoms.

11. The dimethylamine salt of 2-methoxy-3,5,6-trichlorobenzoic acid.

References Cited in the file of this patent

UNITED STATES PATENTS

| | | |
|---|---|---|
| 1,144,270 | Walther | June 22, 1915 |
| 1,846,127 | Laska et al. | Feb. 23, 1932 |
| 1,974,689 | Pfaff et al. | Sept. 25, 1934 |
| 2,695,840 | Leppla | Nov. 30, 1954 |
| 2,759,966 | Beman | Aug. 21, 1956 |
| 2,779,669 | Snyder | Jan. 29, 1957 |
| 2,830,076 | Ruschig et al. | Apr. 8, 1958 |
| 2,848,470 | Girard et al. | Sept. 26, 1958 |
| 2,913,324 | Kosmin | Nov. 17, 1959 |

OTHER REFERENCES

Hirwe et al.: Proc. Ind. Acad. Sci., 8A, 209 (1938).
Thompson et al.: Bot. Gaz., 107, 489 to 490 (1946).
Organic Synthesis, vol. I, p. 537, J. Wiley (1941).